United States Patent [19]

Yeoman

[11] 4,437,963

[45] Mar. 20, 1984

[54] APPARATUS FOR ELECTROLYZING WATER

[76] Inventor: David R. Yeoman, 869 Concourse Village West, Bronx, N.Y. 10451

[21] Appl. No.: 300,812

[22] Filed: Sep. 10, 1981

[51] Int. Cl.³ .................. C25B 1/04; C25B 15/08; F03B 13/10; F03B 13/12

[52] U.S. Cl. .................. 204/229; 204/237; 204/278; 204/129; 290/42; 290/53

[58] Field of Search .................. 290/42, 53; 204/129, 204/275–278, 229, 237

[56] References Cited

U.S. PATENT DOCUMENTS

| | | | |
|---|---|---|---|
| 1,310,727 | 7/1919 | Zorzi | 204/278 X |
| 3,647,672 | 3/1972 | Mehandjiev | 204/278 X |
| 3,870,893 | 3/1975 | Mattera | 290/53 |
| 3,969,214 | 7/1976 | Harris | 204/129 X |
| 4,239,976 | 12/1980 | Collard | 290/53 X |

FOREIGN PATENT DOCUMENTS 2301709  9/1976  France .................. 204/129

*Primary Examiner*—Donald R. Valentine
*Attorney, Agent, or Firm*—Steinberg & Raskin

[57] ABSTRACT

Apparatus for the electrolysis of water comprises an elongated tube and an electrolysis assembly provided at one end of the tube defining an interior chamber which constitutes an extension thereof. The electrolysis assembly includes at least one fixed stator and at least one rotatably mounted rotor and drive means for rotating the rotor in the form of propeller blades mounted on a shaft which is connected to a transmission to the rotor. A pair of fixed electrodes extend across the interior chamber of the electrolysis assembly. A matrix of Wiegand modules are affixed to the rotor and a corresponding matrix of magnet pairs are fixed to the stator. Appropriate circuitry is provided which couples the positive and negative leads of the Wiegand modules to respective ones of the electrodes. When the tube is immersed in a body of water so that its upper end extends out from the water and so that the electrolysis assembly is completely immersed, water tends to rush into the interior chamber under equilibrium forces whereby water tends to seek its own level to rotate the drive means thereby rotating the rotor relative to the stator whereupon the Wiegand modules generate a voltage which is impressed across the electrodes to electrolyze water which comes into contact therewith.

10 Claims, 6 Drawing Figures

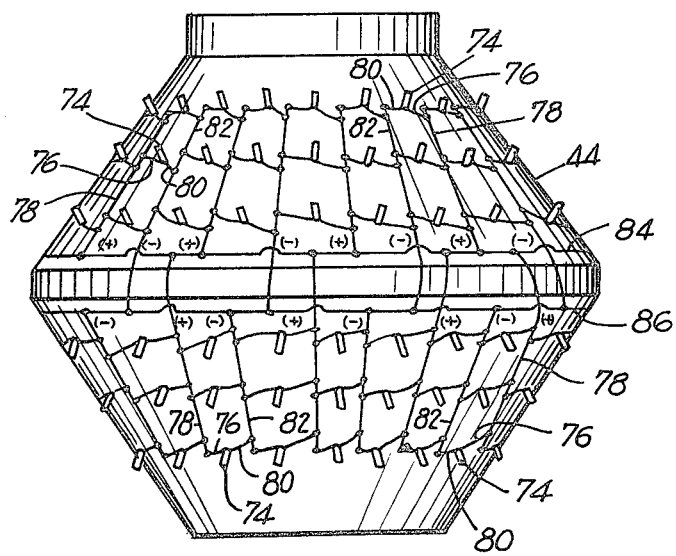
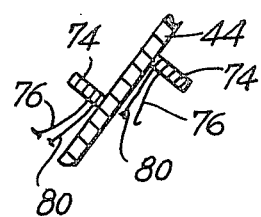
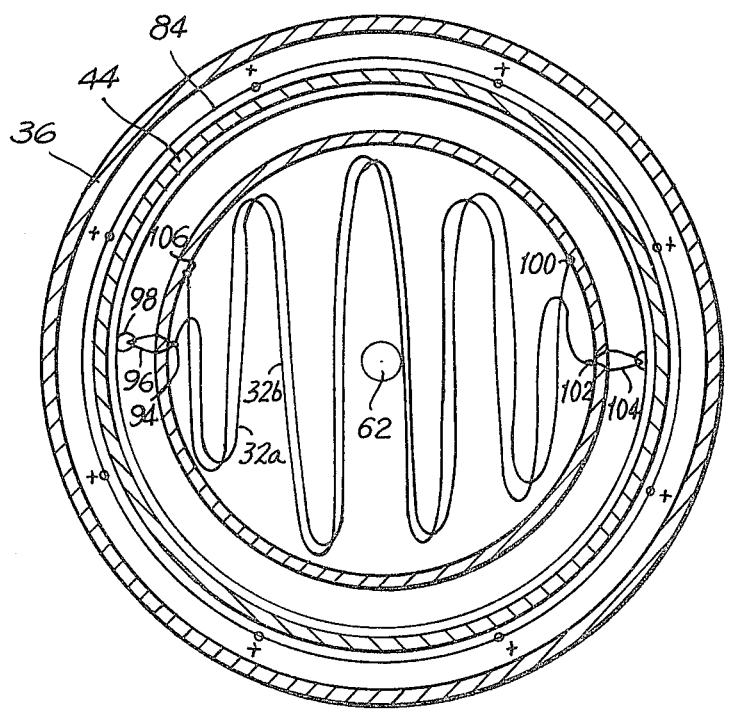

APPARATUS FOR ELECTROLYZING WATER

BACKGROUND OF THE INVENTION

It has long been recognized that if the hydrogen on earth were readily accessible it could become a major and virtually unlimited source of energy. For example, when cooled and liquified, it could serve as fuel for modified internal combustion engines and when passed through fuel cells, it could generate electricity.

However, most of the hydrogen found on the earth is bound with oxygen in the form of water. For this reason, there have been numerous attempts to develop techniques of splitting water into its two components, hydrogen and oxygen. Most recently, attempts have been made to achieve such splitting by photosynthesis. In one such arrangement, spinach chloroplasts are placed in a solution containing various substances including enzymes which speed up the reaction. In effect the energy of the sun is captured by the chloroplasts which use the energy to disassociate a molecule of water into its component parts, hydrogen and oxygen. This technique, although promising, has not as yet proven feasible for commercial applications.

It has been known for many years that water can be split by electrolysis whereby an electric current passed through water breaks the bond between the hydrogen and oxygen atoms in the water molecules thereby releasing hydrogen as well as oxygen. However, it has not been possible to adapt electrolysis processes to commercial applications due to the fact that the amount of electricity required to produce practical amounts of hydrogen has to the present been prohibitively expensive.

SUMMARY OF THE INVENTION

Accordingly, one object of the present invention is to provide new and improved methods and apparatus for the electrolysis of water.

Another object of the present invention is to provide new and improved methods and apparatus for the electrolysis of water wherein substantially no external source of electricity is required.

In accordance with the present invention, these and other objects are attained by utilizing a recently discovered principle in the field of electro-magnetics. In this connection, reference is made to U.S. Pat. No. 3,820,090 issued June 25, 1974 to John R. Wiegand which discloses a technique wherein a wire (hereinafter, a "Wiegand wire") is specially treated so as to possess a unique magnetic property whereby when it is moved past a magnet, the polarity of the Wiegand wire will rapidly shift and generate strong electrical pulses without any external power being supplied. Thus, by this technique, the magnetic fields in a suitably prepared wire can be made to reverse suddenly and this phenomenon can be used to generate sharp, uniform electrical pulses. Such pulses can be produced using only a short length of wire, a permanent magnet, and a pick-up coil.

Thus, in an unmagnetized ferrous magnetic material, the magnetized regions or domains are randomly oriented and thereby cancel each others magnetic effect. If the material is placed in an external magnetic field, the domains gradually shift polarity to line up with the applied field until the material becomes magnetically saturated, i.e., all its domains are neatly lined up in the direction of the field. However, if the magnetic field is increased in a gradual manner to its full strength, the domains will "snap" into alignment at different times as various magnetic field values are attained. This sudden snapping action is the well-known "Barkhausen jump" and such jumps can be detected by a coil wrapped around the material and in which a small voltage is generated as described above.

The Wiegand wire essentially constitutes a wire formed of vicalloy (vanadium cobalt alloy) which is work-hardened by suitably twisting and tempering the same so that it has a permanent deformation that helically winds around its circumference. Such configuration forces the domains in the Wiegand wire to maintain their polarity when exposed to an increasing magnetic field until a certain threshhold is reached at which time the domain abruptly undergoes a single "leap", i.e., the polarities of all of the domains are reversed simultaneously. The effect of the magnetic leap is enhanced by the wires twisted-in tension which renders it bistable. The magnetic leap produces pulses that can be detected by a pick-up coil wrapped around the wire. No power source is needed to pick up the pulse.

Wiegand modules which comprise a copper sensing coil wound around a short piece of Wiegand wire as well as literature describing the operating parameters of the same, are available from Sensor Engineering Co. of Hamden, Conn.

Briefly, the present invention incorporates a matrix of Wiegand modules in a construction whereby equilibrium forces of a body of water are utilized to create an appropriately varying magnetic field to which the Wiegand modules are exposed whereby a voltage is generated in the respective pick-up coils of the modules. The voltages are summed and impressed across a pair of grids immersed in the body of water so that the grids act as an anode and cathode, respectively, to electrolyze the water.

In the illustrated embodiment of the invention, the apparatus includes an elongated tube having a substantially cylindrical configuration over substantially its entire length and which is adapted to be immersed in a body of water to obtain a substantially vertical configuration. An electrolysis assembly is provided at the lower end of the tube which includes at least one stator forming an enlarged portion of the tube and a rotor rotatably mounted on the tube. The stator defines an interior chamber which communicates with the interior of the cylindrical tube and a pair of grids extend in proximate relationship to each other transversely across the chamber. A drive mechanism in the form of one or more rotary propeller blades is mounted in the chamber and is suitably coupled to the rotor in a manner such that as water passes the blades to rotate the same, the rotor is caused to continuously rotate in close proximity to the stator.

A matrix of Wiegand modules are fixed to the rotor and a corresponding matrix of magnets are fixed to the stator. The rotor, stator, Wiegand modules and magnets are arranged such that with each rotation of the rotor, the Wiegand modules will approach and pass in proximity to a plurality of magnets whereby during rotation, each Wiegand wire will see a continuous series of appropriate excursions in magnetic field strength resulting in the generation of continuous series of voltage pulses. Each of the pair of leads extending from each of the pick-up coils of each Wiegand module is connected to a corresponding one of the pair of grids, respectively, through suitably arranged circuitry whereby the generated voltages are summed and impressed across the pair of grids.

In operation, the apparatus is immersed into a body of ionizable water until the tube is substantially entirely immersed therein with only its upper end extending into the atmosphere and with the electrolysis assembly being situated at the lower immersed end. It will be understood that the interior of the tube as well as the interior chamber of the electrolysis assembly is initially devoid of water. After immersion, water enters the lowermost end of the electrolysis assembly and begins to flow upwardly under equilibrium forces and passes the propellers which are thereby caused to rotate which in turn rotates the rotor through an appropriate transmission. Rotation of the rotor results in appropriate voltages being generated by the Wiegand modules which are impressed across the pair of electrolysis grids which act as electrodes to electrolyze the water as the same rises into contact therewith, the hydrogen and oxygen gases being formed by the electrolysis being transmitted upwardly through the tube to exit from the upper end thereof.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which:

FIG. 4 is a schematic view of the rotor of the electrolysis assembly of the present invention illustrating the Wiegand modules circuitry associated therewith;

FIG. 5 is a partial section view of the rotor of the electrolysis assembly of the present invention; and FIG. 6 is a section view taken along lines VI—VI of FIG. 3 and illustrating the electrolysis grids.

DESCRIPTION OF THE PREFERRED EMBODIMENTS

Figure 1:
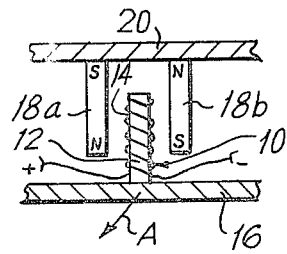
FIG. 1 is a schematic view of a Wiegand module and associated magnet illustrating the operation thereof.

Referring now to the drawings wherein like reference characters designate identical or corresponding parts throughout the several views, FIG. 1 schematically illustrates a Wiegand module 10 constituted by a Wiegand wire 12 having a pickup coil 14 wound around the same. One end of Wiegand module 10 is embedded in a plate 16. A pair of permanent magnets 18a and 18b are embedded at their reversed polarity ends in a separate plate 20. It will be understood by a person skilled in the art that when plate 16 is moved relative to plate 20 as designated by arrow A so that the Wiegand module 10 passes between magnets 18a and 18b, voltage is generated in the pickup coil 14. The particular design characteristics of the Wiegand module and associated magnets are chosen in the instant application so as to provide a suitable voltage that will be readily ascertainable by a person skilled in the art, such as through experimentation. It is sufficient to note herein that in all cases, the Wiegand module 10 must see an excursion in field strength from one value to another, and from one orientation to another, in that the magnetic field should be about the same length as the Wiegand wire or Wiegand module and should be substantially parallel to it. Further discussion of the principle and theory of the Wiegand effect is beyond the scope of the instant application, it being understood that those skilled in the art will readily understand the manner in which the dimensions, gauss levels of the magnets and other design criteria can be obtained for its use herein.

Figure 2:
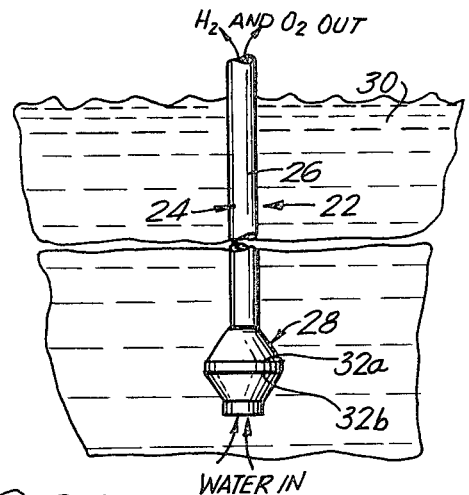
FIG. 2 is a schematic view of the apparatus of the present invention.

Referring now to FIG. 2, the apparatus 22 of the present invention comprises a tube 24 preferably having a cylindrical configuration over the major portion 26 of its length. For example, the cylindrical portion 26 of tube 24 may have a length of about 130 feet. An assembly 28 for electrolyzing water forms a terminal extension of tube 24. As described in detail below, electrolyzing assembly 28 incorporates a matrix of Wiegand modules and magnets provided on rotor and stator structure. In the operation of the apparatus which will also be described in detail below, the tube 24, whose interior is devoid of water, is immersed in a body of water 30 until it obtains a substantially vertical orientation and so that only its uppermost extends out of the water. As soon as this positioning is completed, water will begin to rush into the bottom of the tube 24 into an interior chamber defined within the electrolyzing assembly 28 under the equilibrium forces whereby water tends to seek its own level. The rush of incoming water rotates propeller blades which are mounted within the interior chamber which rotates the rotor through a suitable transmission. This results in the Wiegand module "seeing" an appropriately varying magnetic field whereby a voltage is generated which is impressed across a pair of grids 32a and 32b which extend transversely across the interior chamber of assembly 28. The water reaching grids 32 is electrolyzed with resulting hydrogen and oxygen gas being collected as it exits from the upper end of tube 24. Since substantially entirely all of the water is electrolyzed, the process will continue for long periods of time as the water will contintinuously rush into the lower end of tube 24.

Turning now to FIGS. 3-6, the illustrated embodiment of the apparatus 22 of the invention includes tube 24 whose major portion 26 has a substantially cylindrical configuration. Tube 24 terminates at its lower end in the electrolyzing assembly 28. More particularly, electrolyzing assembly 28 comprises a substantially closed double-wall shell-like structure 34. This shell-like structure 34 is defined by an outer wall or stator 36 which integrally extends from and is thereby supported by tube portion 26 and an inner wall or stator 38 which follows the shape of the outer stator 36. The shell-like structure 34 has an outer configuration which is preferably that of a pair of cones connected at their bases and which defines an interior chamber 40 there within. A reduced diameter opening 42 is provided at the lowermost end of the shell-like structure 34 through which water can enter into chamber 40.

A rotor 44 formed by a single wall having a similar double cone configuration is situated in the space defined between the outer and inner stators 36 and 38 and is rotatably mounted to a cylindrical extension 50 of the tubular portion 26 coaxially therewith by bearings 46 and 48 within that space. An annular flange 52 of rotor 44 extends inwardly into the uppermost region of chamber 40 through an annular slot 54 defined between the lower edge of cylindrical extension 50 and the upper edge of inner stator 38. A pair of seals 56 and 58 are provided for fluidly sealing the space between the outer and inner stator 36 and 38 from the chamber 40 and yet which permit rotation of rotor 44.

A drive mechanism, generally designated 60, is provided within chamber 40 and includes a shaft 62 having three propeller blades fixed thereto. An upper propeller blade 64 is fixed to the upper region of shaft 62 and has an outer circumferentially extending rim 66 which is coupled to the inner edge of flange 52 thereby rotatably mounting the shaft 62 as shown. It is seen that rotation of shaft 62 will result in the rotation of rotor 44 through the upper propeller 64, rim 66, and flange 52. Of course, other transmissions may be utilized such, for example, as a so-called nutating transmission for transmitting the rotation of shaft 62 to rotor 44.

An intermediate, larger diameter propeller 68 is fixed to shaft 62 somewhat below the large diameter mid-section of chamber 40. A third, lower propeller 70 is fixed to the lower region of shaft 62 and is situated within the opening 42 defined by the shell-like structure 34. A screen-like filter 72 extends across opening 42 for reasons discussed below.

The number of blades in each of the propellers 64, 68 and 70 as well as the particular configuration thereof is determined according to their function. Thus, as water enters chamber 40 through opening 42 under the equilibrium forces acting thereon, the lower propeller 70 is cause to rotate thereby initiating the rotation of shaft 62 and, therefore, of rotor 44. As the water continues to fill the chamber 40, it passes through the larger diameter propeller 68 which is designed so as to rotate the shaft 62 and rotor 44 at the final desired speed. The water then rises to the level of grids 32a and 32b over which a voltage has been impressed as discussed below whereby the water is electrolyzed. The hydrogen and oxygen gas formed passes upwardly past upper propeller 64 which is appropriately designed to adjust the rate at which the gas flows outwardly from the chamber 40.

Figure 3:
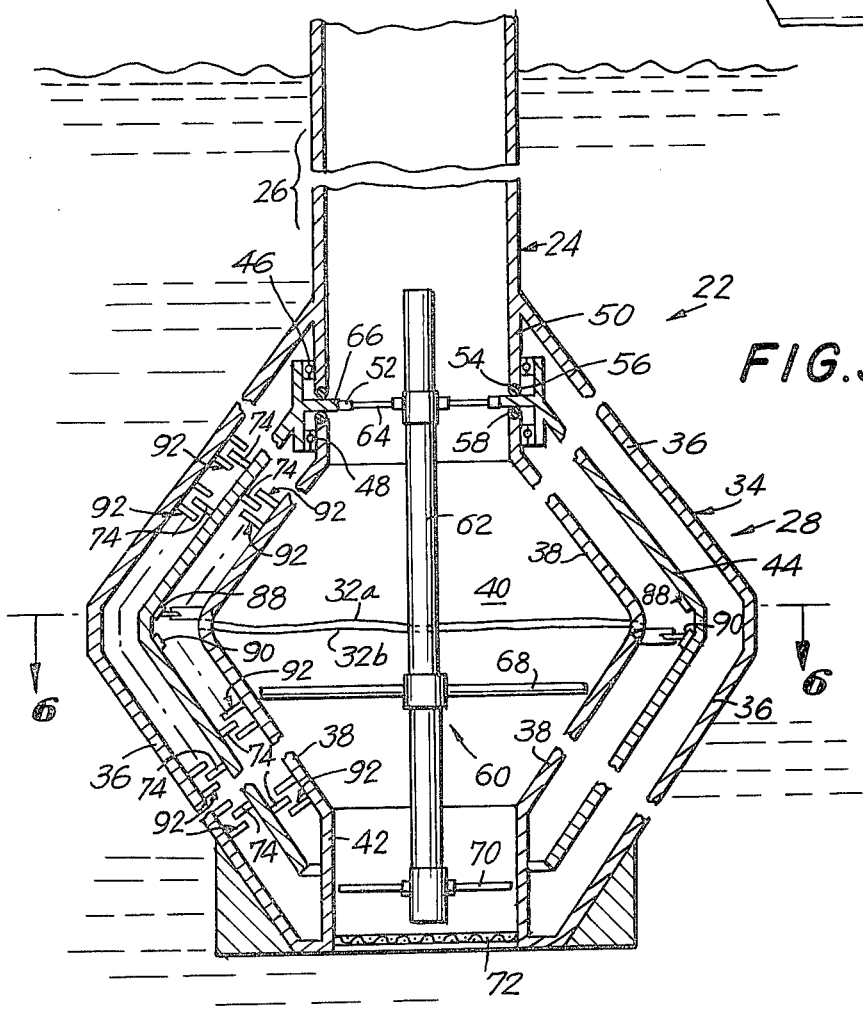
FIG. 3 is a schematic view illustrating in detail the construction of the electrolysis assembly of the present invention.

Referring to FIGS. 3–5, a plurality of Wiegand modules 74 are fixed in a regular pattern on both the inwardly and outwardly facing surfaces of the rotor 44. As seen in FIG. 4 which illustrates the matrix of Wiegand modules provided on the outer surface of rotor 44, the Wiegand modules are fixed to the rotor in circular arrays extending horizontally around the rotor. It is understood that a similar matrix of Wiegand modules are provided on the inner surface of rotor 44 as best seen in FIG. 3. The positive lead 76 of each Wiegand module 74 is connected to vertically extending main positive conductors 78 while the negative leads 80 of the Wiegand modules 74 are connected to respective main negative conductors 82. The main positive and negative conductors 78 and 82 terminate at respective interconnecting conductors 84 and 86, respectively which are in turn connected to respective conducting rims 88 and 90 (FIG. 3) which extend around the inner surface of rotor 44 at the major diameter portion thereof.

A plurality of pairs of magnets 92 are fixed to the outer and inner stators 36 and 38 to form respective matrixes. The matrixes of magnet pairs 92 are provided in a pattern such that each magnet pair 92 corresponds to a particular Wiegand module 74 in a manner such that as the rotor 44 rotates, the Wiegand modules 74 will pass between respective magnet pairs 92 simultaneously. It is therefore seen that during one revolution of the rotor 44, a particular Wiegand module 74 will see an excursion in magnetic field strength from one value to another and from one orientation to another as it passes through a particular magnet pair 92 given rise to a sharp electrical pulse and that a plurality of such pulses will be generated by a particular module during each revolution of the rotor 44. Thus, during rotation of rotor 44, a continuous series of positive and negative electrical pulses will be transmitted through the main positive and negative conductors 78 and 82 and positive and negative interconnecting conductors 84 and 86 to the respective positive and negative conducting rims 88 and 90. When the rotor 44 is rotating at its appropriate speed, an appropriate potential difference or voltage generated between the positive and negative conducting rims 88 and 90.

Referring now to FIGS. 3 and 6, a pair of grids 32a and 32b extend transversely across chamber 40 at the major diameter portion thereof. In the illustrated embodiment, grids 32a and 32b comprise conductors which follow a serpentine path and which are vertically spaced one over the other in close proximity to each other. One end 94 of grid 32a is connected to a conductive roller assembly 96 which includes a roller 98 adapted to roll over the positive conducting rim 88, the other end 100 of grid 32a being insulatingly connected to the inner stator 38. Similarly, one end 102 of grid 32b is connected to a conductive roller assembly 104 which continuously engages the negative conducting rim 90, the other end 106 of grid 32b being insulatingly connected to the stator 38.

It will be seen from the foregoing that as the rotor 44 rotates, a potential difference will be applied over conducting rims 88 and 90 which will be impressed over the respective grids 32a and 32b through the conductive roller assemblies 96 and 104. Accordingly, during rotation of rotor 44, the grids 32a and 32b will act as an anode and cathode, respectively.

In operation, apparatus 22 is immersed into a body of ionizable water until the tube 24 extends substantially vertically with the upper end extending into the atmosphere. Water will begin to rush into the chamber 40 under equilibrium forces through filter 72 which prevents the entry into chamber 40 of unwanted solid materials such as plankton, fish, etc. The opening 42 is appropriately sized to adjust the amount of water entering into chamber 40. As the water rises within chamber 40, it passes the lower and intermediate propellers 70 and 68 thereby initiating rotation of shaft 62 and, consequently, rotor 44 through the transmission connection 66 of upper propeller 64. A fly wheel may be provided to conserve the rotational energy acquired by the rotor. The Wiegand modules are of course rotating through the magnetic fields of the magnet pairs 92 generating a substantially continuous series of positive and negative pulses which are applied to the grids 32a and 32b in the manner described above. By the time water reaches the level of grids 32a and 32b, an appropriate potential difference is impressed across the grids to electrolyze the water reaching the same. In this manner, the water is broken down into hydrogen and oxygen gas which passes through the cylindrical portion 26 of tube 24 exiting from the same at its upper end.

It is seen from the foregoing that electrolysis of water is obtained without the necessity of an external power source using the equilibrium forces acting on the water through the apparatus. A suitable valve may be provided in opening 42 in order to control the entry of water into chamber 40. Further, the present invention is not limited to the particular embodiment illustrated in the drawing. For example, the electrolyzing assembly 28 may be provided with a plurality of rotors and stators to provide increased electrical energy through the provision of additional Wiegand modules and magnet pairs. The permanent magnet comprising magnet pairs 92 may be replaced by suitable electro magnets. Further, other arrangements for providing the varying magnetic field seen by the Wiegand modules may be utilized such, for example, as a rotating shunt or the like.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for the electrolysis of water, comprising:
   an elongated tube;
   an electrolysis assembly provided at one end of said tube defining an interior chamber constituting an extension of said tube, said electrolysis assembly including,
   at least one fixed stator and at least one rotatably mounted rotor,
   drive means for rotating the rotor adapted to be driven by a flowing fluid,
   a pair of fixed electrodes extending across said interior chamber,
   a matrix of modules, each module comprising bistable magnetic means having a reversing polarity when exposed to an increasing magnetic field and having respective positive and negative leads, affixed to one of said rotor and stator and magnetic field generating means provided on the other of said rotor and stator, and
   circuit means coupling said positive and negative leads of said modules to respective ones of said electrodes;
   whereby upon a fluid being caused to flow through said interior chamber, said drive means effect rotation, of said rotor with respect to said stator whereupon said modules are exposed to continuous excursions in magnetic field strength to generate a voltage which is impressed across said electrodes to electrolyze water coming into contact with the same.

2. The combination of claim 1 wherein said drive means comprise at least one propeller mounted on a rotatable shaft located within said interior chamber, and transmission means interconnecting said shaft and said rotor whereby upon fluid flowing past said propeller, said shaft is caused to rotate thereby rotating said rotor.

3. The combination of claim 1 wherein said magnetic field generating means comprise a plurality of magnet pairs affixed to the other of said rotor and stator.

4. The combination of claim 3 wherein said matrix of modules are affixed to said rotor and said magnet pairs are affixed to said stator.

5. The combination of claim 4 wherein said circuit means include conductive means for carrying the voltage generated by said modules from said rotor to said fixed electrodes.

6. The combination of claim 5 wherein said conductive means comprise positive and negative conducting rims connected to said positive and negative leads of said modules respectively and extending around the inner surface of said rotor, a first conductive roller assembly electrically coupled to one of said electrodes and including a roller engaging said positive conducting rim and a second conductive roller assembly electrically coupled to the other one of said electrodes and including a roller engaging said negative conducting rim.

7. The combination of claim 1 wherein said at least one stator comprises a shell-like structure defining an inner and an outer stator, said rotor being situated between said inner and outer stators and having a pair of inner and outer surfaces facing said inner and outer stators, respectively.

8. The combination of claim 7 wherein said modules are affixed to both of said pair of inner and outer surfaces of said rotor and said magnetic field generating means are provided on both said inner and outer stators.

9. The combination of claim 8 wherein said magnetic field generating means comprise a plurality of magnet pairs affixed to both said inner and outer stators.

10. An electrolysis assembly for electrolyzing water comprising at least one fixed stator defining an interior chamber and at least one rotatably mounted rotor; drive means for rotating the rotor; a pair of fixed electrodes extending across said interior chamber; a matrix of modules, each module comprising bistable magnetic means having a reversing polarity when exposed to an increasing magnetic field and having respective positive and negative leads, affixed to one of said rotor and stator and magnetic field generating means provided on the other of said rotor and stator; and circuit means coupling said positive and negative leads of said modules to respective ones of said electrodes.

* * * * *